//
US007127537B2

(12) United States Patent
Schreiber et al.

(10) Patent No.: US 7,127,537 B2
(45) Date of Patent: Oct. 24, 2006

(54) METHOD AND APPARATUS FOR PRE-PROCESSING IN A COMMON-FORMAT CONTROL PROCESSING INPUT SIGNALS OF, OR OUTPUT SIGNALS FOR, INTERFACES OF DIFFERENT TYPE

(75) Inventors: Ulrich Schreiber, Garbsen (DE); Markus Schneider, Hannover (DE); Ulrich Gries, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 351 days.

(21) Appl. No.: 10/775,468

(22) Filed: Feb. 10, 2004

(65) Prior Publication Data

US 2004/0161040 A1    Aug. 19, 2004

(30) Foreign Application Priority Data

Feb. 12, 2003 (DE) ................................ 030 90 038

(51) Int. Cl.
  G06F 13/00 (2006.01)
  G06F 31/00 (2006.01)
(52) U.S. Cl. .................... 710/65; 710/73; 710/305; 386/84; 386/95
(58) Field of Classification Search ............ 710/62–73, 710/305–310; 360/32, 48; 386/84–91, 95–99
See application file for complete search history.

(56) References Cited

U.S. PATENT DOCUMENTS

| 3,886,317 | A | * | 5/1975 | Drapkin ...................... 370/522 |
| 4,607,345 | A | * | 8/1986 | Mehta .......................... 710/61 |
| 4,823,207 | A | * | 4/1989 | Kobayashi et al. ........... 360/32 |
| 5,341,368 | A | * | 8/1994 | Henning et al. ............. 370/351 |
| 5,684,919 | A | * | 11/1997 | Kikuzawa et al. ............ 386/95 |
| 5,811,707 | A | * | 9/1998 | Kakehashi et al. .......... 84/610 |
| 6,029,221 | A |   | 2/2000 | Wu et al. .................... 710/305 |
| 6,128,681 | A |   | 10/2000 | Shephard ..................... 710/71 |

* cited by examiner

Primary Examiner—Christopher Shin
(74) Attorney, Agent, or Firm—Joseph J. Laks; Robert D. Shedd

(57) ABSTRACT

In audio processing technology there are interfaces of different type, the different interface types being associated with differing sample clock frequencies and/or differing data frame or data word formats. In some applications it is desired do process audio signals that stem from such interfaces of different type. According to the invention the input signals of the interfaces of different type are pre-processed for a subsequent common-format central processing, using a synchronization to the common system clock, channel decoding according to the differing channel protocols related to the different-type interfaces, and processing the resulting PCM bitstream format signals so as to form therefrom sample words that are stored in an intermediate store from which the sample words are fed to the central processing.

18 Claims, 8 Drawing Sheets

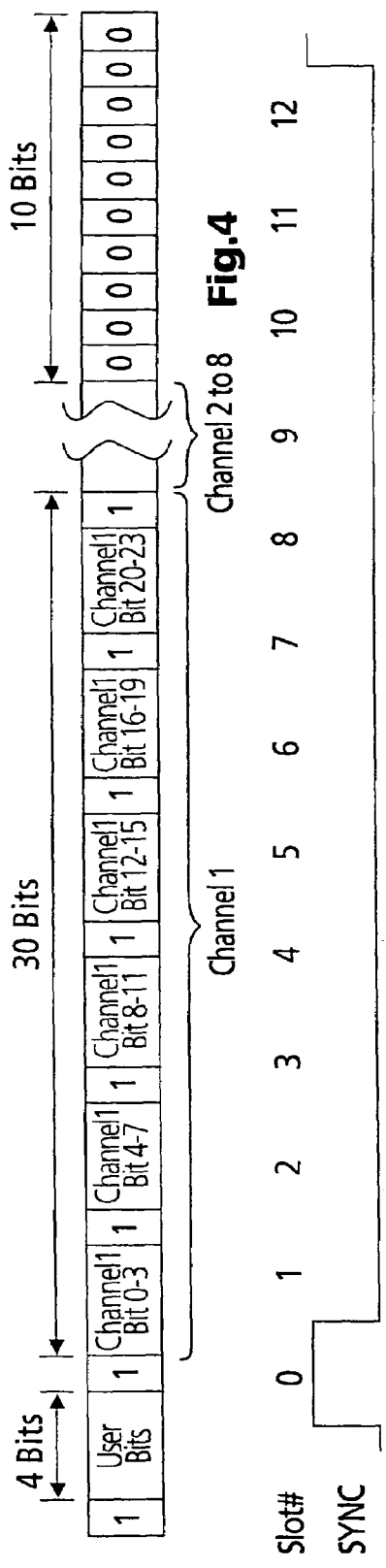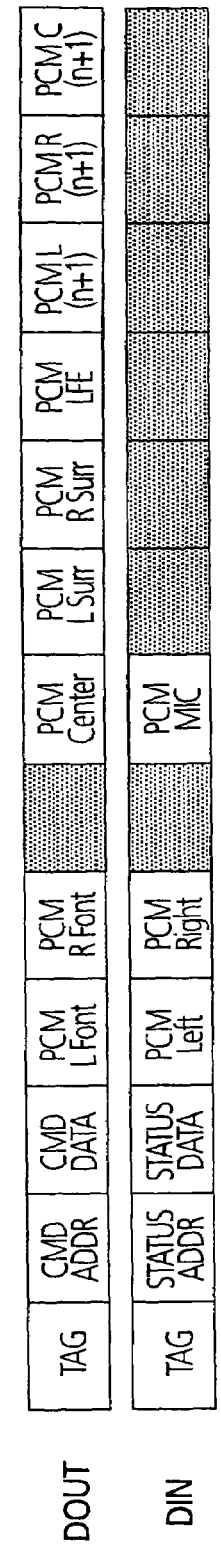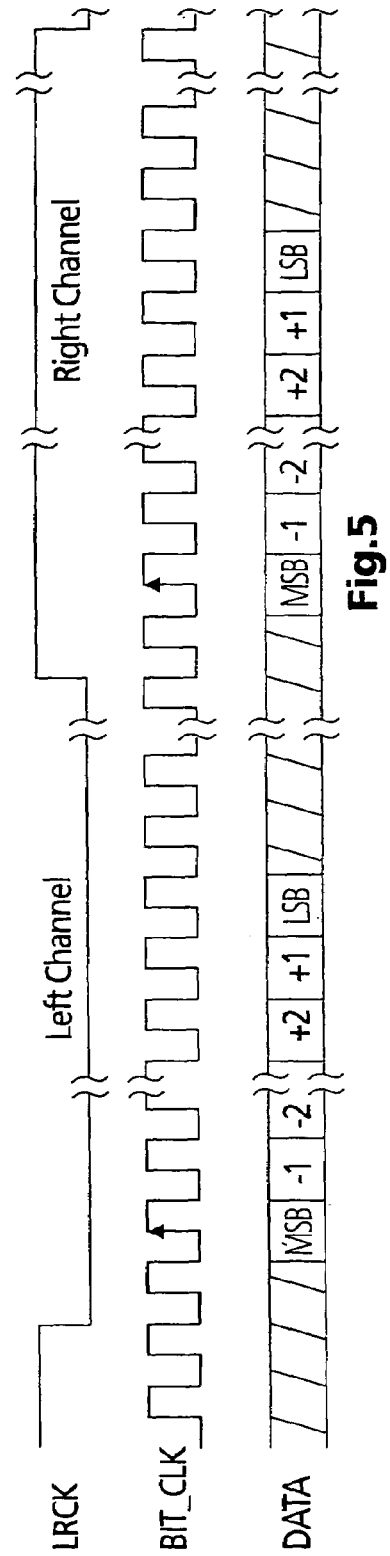
Fig.4
Fig.3
Fig.5

Constant Synchronizer Data delay: using opt. TFF0 : 3 bck cycles --if-- $T_{min} > 4*T_{sck}+(T_{clkToOut}+T_{setup}+T_{safety})$ (i.e. $F_{sysclk} > (4.x)*F_{bck}$)
without/bypassing: 2 bck cycles

METHOD AND APPARATUS FOR PRE-PROCESSING IN A COMMON-FORMAT CONTROL PROCESSING INPUT SIGNALS OF, OR OUTPUT SIGNALS FOR, INTERFACES OF DIFFERENT TYPE

This application claims the benefit under 35 U.S.C. §365 of European patent application numbered 03090038.5 filed Feb. 12, 2003.

FIELD OF THE INVENTION

The invention relates to a method and to an apparatus for pre-processing in a common-format central processing input signals of, or output signals for, interfaces of different type, using a common system clock.

BACKGROUND OF THE INVENTION

Various digital audio input/output audio interfaces for A/V systems are in common use, like IEC958 and ADAT for digital IO, or AC-Link and I2S primarily for connection to AD/DA converters. Nowadays, a typical interface application often requires more than a single type of interface. Known building blocks for such interfaces usually implement a single interface. A receiver for example consists of a protocol decoder outputting clean data bits and a bit clock for the subsequent serial-to-parallel converter forming from the serial data bit stream a sequence of sample words. The sample words are then written to a memory of the processing system, using e.g. DMA (direct memory access) and/or interrupt or polling data transfer and, if required, a FIFO for buffering the audio data. A transmitter will consist of similar components implementing the corresponding opposite data processing direction. Typical systems will use DMA for the data transfer, due to the ratio of processor clock and audio sampling frequency. The basic DMA transfer operation can be done by software if processing speed does not matter. The following refers sometimes to the use of DMA, but DMA input and output can be replaced in the invention in each case by interrupt or polling mechanisms.

An interface specialised for a single protocol (like a IEC958 receiver) will typically also use a specialised serial-to-parallel converter (or parallel-to-serial converter in case of transmitter), i.e. one that implements MSB first or LSB first, number of bits etc according to the interface requirements.

SUMMARY OF THE INVENTION

When combining different types of audio interfaces for interaction with a common or central processor, multiple different operating conditions must be considered. Basically, such interfaces will use a serial transmission of the audio data either with few or without any accompanying synchronisation and clock signals. Further, audio interfaces are using special audio-related clocks that are not related to the system clock of the processor or a bus. Therefore incorporating more than one concurrently used audio interface leads to the occurrence of several independent audio clocks, up to one additional different clock per active interface. All above-mentioned interfaces transport up to 24-bit PCM data words, whereby several sequentially transmitted PCM data words form a complete audio sample (IEC958, I2S type 2, stereo; ADAT type 8; AC-Link types 2 to 6: multichannel). For some types of interfaces additional side information is merged with the PCM audio information bits, e.g. SPDF: VUC; ADAT: User Bits; AC-Link: Tag, Cmd, Status. Serial PCM data transmission can be either LSB (least significant bit) first or MSB (most significant bit) first.

A problem to be solved by the invention is to facilitate common system clock pre-processing of interfaces input or output signals of different type, wherein the different interface types are associated with differing sample clock frequencies and/or differing data frame or data word formats, and to make the common system clock operated area as large as possible.

In the following the terms 'audio sample' or 'sample' will denote a complete K channel sample consisting of K numbers (or words), one number for each one of the channels, whereby K is the number of audio channels. These numbers will be denoted 'sample word' or 'word'.

The inventive audio interface architecture is related to the implementation of a parameterised universal audio IC cell or unit, which unit can process data coming from, or fed to, at least all of the above-mentioned types of interfaces—concurrently and in various configurations—in a central processing system, in a manner that keeps as much flexibility as possible for system IC design, PCB design, and software design. The invention is related to the overall architecture of the cell or unit, and to specific detail solutions.

DSPs (digital signal processors) often contain universally configurable serial interfaces SIO (serial input output) that allow input and output of DSP data words in various special serial data formats. As an alternative to the above-mentioned interface specialised for a single protocol, for implementing one of the above-mentioned multi-type interfaces such a universal SIO can be combined with a specific protocol decoder or encoder. The complete unit can be clocked with the bit clock or the respective channel clock. Access to the parallel sample words by the processor is preferably provided using the processor clock.

FIG. 1 shows an example architecture of a digital audio interface unit according to the invention. The serial audio data input SADI and the serial audio data output SADO signals are shown on the left and the system bus SB connecting to a system processor (RISC, DSP or μP, not depicted) on the right. All audio clock related signals are synchronised as early (inputs) or late (outputs) as possible to the system clock, which system clock may be equal to the bus clock. Advantageously this makes the system clock processing domain as large as possible, i.e. that part of the logic which is clocked solely with the system clock. Via a general-purpose input block GPI (containing synchronisation stages and control logic for bi-directional general-purpose use of the SADI signals) a number of N audio data inputs feed—one by one—N channel decoder units 11 that cope with channel protocol decoding (i.e. IEC958, I2S, AC-Link, ADAT etc. protocols) and determine the data bit type (e.g. PCM, subcode or ignore) per input bit. The resulting N sets of general PCM bit stream format signals are fed to an interface type-independent stream unit 13, which outputs the incoming serial data bits (PCM and subcode) from a single one or multiple ones of the N inputs as sample words to a FIFO 14, possibly using intermediate storage in registers. FIFO 14 can pass its output signal via a bus interface 15 to bus SB. Correspondingly, the data from bus SB pass through bus interface 15, FIFO 14, stream unit 13, M channel encoder units 12 and a general-purpose output block GPO (containing synchronisation stages for the serial audio data outputs and control logic for bi-directional general-purpose use of the SADO signals) to the output providing M serial audio data output signals SADO, whereby M can be different from N. The channel encoder units 12 encode the general PCM bit stream to the different interface formats, i.e. contain one or more of IEC 958, AC'97, I2S and ADAT encoders. Stream unit 13 carries out a serial/parallel conversion. It collects all incoming PCM bits from the different input signals belonging to one stream and puts them in a register file 19, the content of which can thereupon be transferred to FIFO 14, and vice versa for data coming from FIFO 14. In order to handle e.g. eight concurrent audio streams—each consisting of maximal 16 channels—there are 8 different stream units. Register file 18 contains all control and status registers for the audio cell. Clock unit 16 generates the synchronised internal bit clock and enable signals. Timer Unit 17 includes a counter for the current system time, a loadable timer and a register to sample the system time with an external reference signal. The input data SADI and the output data SADO are accompanied by a corresponding bit clock BCK, a master clock MCK and a signal LRCK specifying the first bit of the first PCM word of a complete audio sample for interfaces types that have separate clock, data and sync, for example I2S and AC97, which clocks or sync signals are selected and synchronised to the system clock by clock unit 16. The protocol converter as well as the serial/parallel conversion can be clocked by the common bit clock/channel clock.

In principle, the inventive method is suited for pre-processing input signals of interfaces of different type for common-format central processing, using a common system clock, said different interface types being associated with differing sample clock frequencies and/or differing data frame or data word formats, including the steps:
generating from the different-type interface input signals system clock synchronised input signals;
channel decoding said system clock synchronised input signals according to the differing channel protocols related to said different-type interfaces, thereby providing corresponding PCM bitstream format signals having a uniform word format;
further processing said PCM bitstream format signals so as to form therefrom sample words that are stored in an intermediate store, e.g. a FIFO, from which the sample words are fed to said central processing, or is suited for pre-processing output signals for interfaces of different type in a common-format central processing using a common system clock, said different interface types being associated with differing sample clock frequencies and/or differing data frame or data word formats, including the steps:
further processing sample words that were output from said central processing and stored in an intermediate store, e.g. a FIFO, by forming system clock synchronised PCM bitstream format signals therefrom, which PCM bitstream format signals have a uniform word format and are related to said interfaces of different type;
channel encoding said system clock synchronised PCM bitstream format signals having a uniform word format according to the differing channel protocols related to said different-type interfaces, thereby providing corresponding system clock synchronised output signals;
generating from said system clock synchronised output signals interface-type related output signals that are no more system clock synchronised but conform to said type of interface.

In principle the inventive apparatus is suited for pre-processing input signals of interfaces of different type for common-format central processing, using a common system clock, said different interface types being associated with differing sample clock frequencies and/or differing data frame or data word formats, said apparatus including:
means for generating from the different-type interface input signals system clock synchronised input signals;
means for channel decoding said system clock synchronised input signals according to the differing channel protocols related to said different-type interfaces, thereby providing corresponding PCM bitstream format signals having a uniform word format;
means for further processing said PCM bitstream format signals so as to form therefrom sample words that are stored in an intermediate store, e.g. a FIFO, from which the sample words are fed to a central processing, or is suited for pre-processing output signals for interfaces of different type in a common-format central processing using a common system clock, said different interface types being associated with differing sample clock frequencies and/or differing data frame or data word formats, said apparatus including:
means for further processing sample words that were output from said central processing and stored in an intermediate store, e.g. a FIFO, by forming system clock synchronised PCM bitstream format signals therefrom, which PCM bitstream format signals have a uniform word format and are related to said interfaces of different type;
means for channel encoding said system clock synchronised PCM bitstream format signals having a uniform word format according to the differing channel protocols related to said different-type interfaces, thereby providing corresponding system clock synchronised output signals;
means for generating from said system clock synchronised output signals interface-type related output signals that are no more system clock synchronised but conform to said type of interface.

BRIEF DESCRIPTION OF THE DRAWINGS

Exemplary embodiments of the invention are described with reference to the accompanying drawings, which show in:
FIG. 3 AC'97 format frame;
FIG. 4 ADAT format frame;
FIG. 5 I2S format frame.

DETAILED DESCRIPTION OF PREFERRED EMBODIMENTS

FIGS. 2 to 5 depict an IEC 958 subframe format frame, AC format frame, ADAT format frame and I2S format frame, respectively. From these pictures it appears that the formats are very different.

Figure 7:
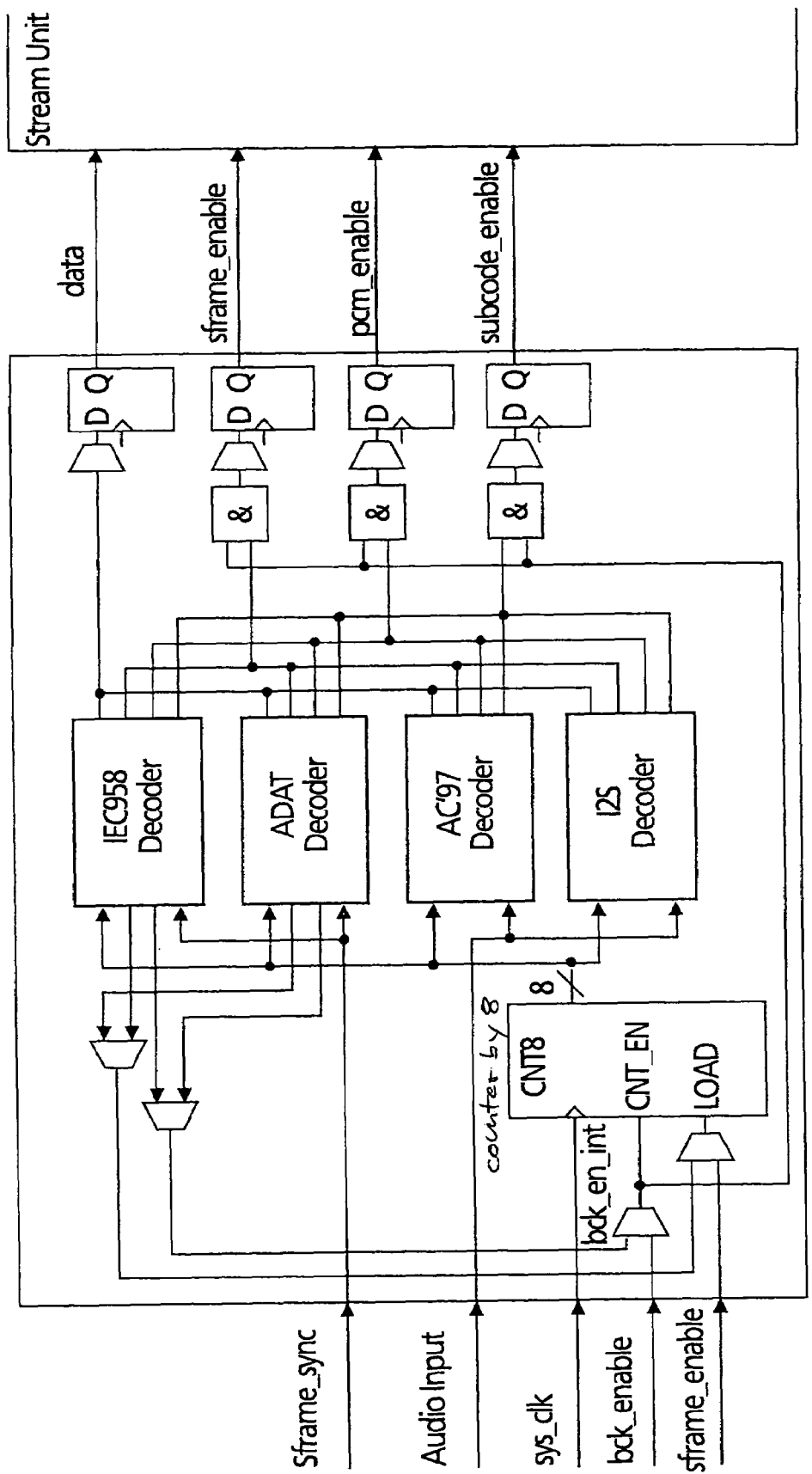
FIG. 7 channel decoder block diagram.

In contrast to current state-of-the-art implementations, the channel decoder block shown in FIG. 7 decodes all or near all of the required protocols. It is related to a fixed input pin. Advantageously, implementing all or most of the protocol decoder functions into a single unit is not as complex as the added complexity of all individual protocol decoders, because a part of the logic (i.e. all logic outside the IEC958, ADAT, AC'97 and I2S boxes) can be shared as depicted in FIG. 7. Particular functions like a clock data separator or preamble detector in the IEC958 and ADAT decoders is not shared. On the other hand, when comparing the number of I/O signals related to the multi-protocol en-/decoders (converters) with a higher number of correspondingly simpler single-protocol en-/decoders (converters), an equal number of I/O pins and some kind of multiplexer logic for connecting them can result in lower complexity for the multiple single-protocol en-/decoders solution, but typically at the cost of less transparency and flexibility.

Stream unit 13 performs the data transfer in form of a number of unidirectional streams. To each stream a set of configuration registers is assigned, determining which input signal(s) and which of the available PCM sample time slots (i.e. first, second, . . . etc. sample word for a single signal input) is to be transferred to FIFO 14 (and thus to the subsequent processing system). Each stream owns its own FIFO (region) that can be accessed by the processing system independently, a distinct DMA unit per stream (not depicted) is consequently required for proper DMA data transfer (the streams operate independently from each other). If an input stream is configured for more than one signal input ('channel aggregation', for example three IEC958 interfaces forming a 3×2 channel stream) all signals must match the same interface type, and must have same sampling frequency and must be in phase. The processing and characteristics of stream output is analogous. There are several design options for the stream unit—using a single FIFO-RAM partitioned by software into appropriately-sized isolated stream FIFOs versus the use of independent FIFOs—transferring bits directly from/to the FIFO(-RAM) to/from channel encoder/decoders, i.e. processing all bits sequentially (may limit total data rate) without need for any intermediate registers, or using intermediate (shift) registers arranged between FIFO 14 and the channel decoders 11 and channel encoders 12.

As discussed before, all channel encoders/decoders as well as the stream unit or units are clocked with a common system clock due to synchronisation close to the signal I/O pins. In state-of-the-art processing, in a typical audio scenario with several input and output streams running at the same time, SIO-type (serial input output) implementation will run the related SIO units using several different (bit/channel) clocks in general. Thus an overall optimisation by merging the SIO units is impossible, while being possible in the invention for the stream unit 13 due to the single (system_)clock used. This allows implementing the complete stream unit or units without a large set of audio data path registers, by either reading/writing the serial audio bitstreams directly to the FIFO (bit wise or using a single read/modify/write register). Another feature becoming easily implementable is the channel aggregation, i.e. merge of several I/O-signals of same type into a common stream. Each logical stream selects which I/O signal(s) are used for that stream, whereby the I/O signal multiplexers are located in the stream unit.

Figure 12:
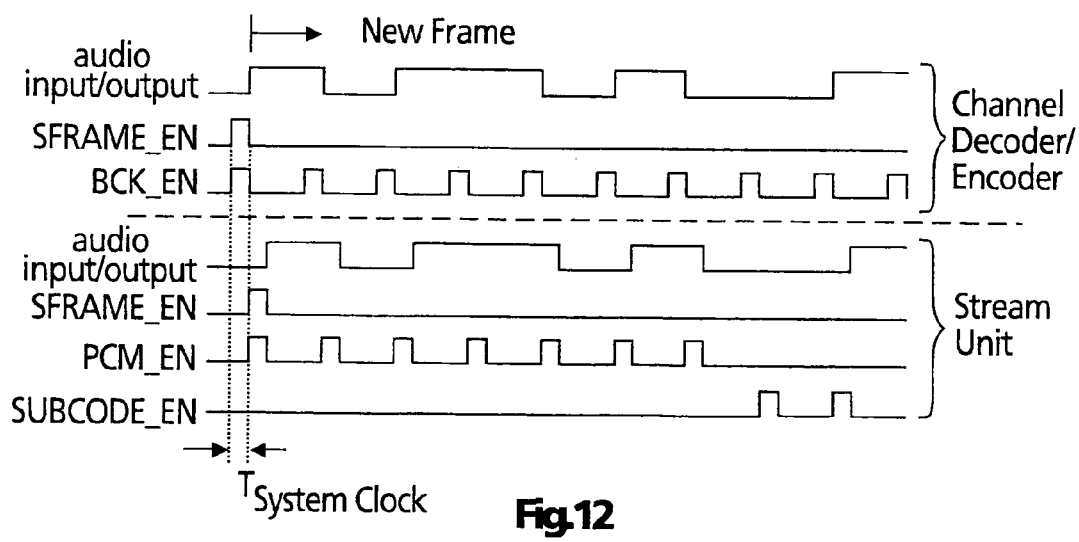
FIG. 12 timing of channel encoder/decoder and stream unit.

In the upper half of FIG. 12 the timing of some signals in channel encoder 11 and channel decoder 12 is shown together with the timing of some signals in stream unit 13 in the lower half of FIG. 12.

Figure 11:
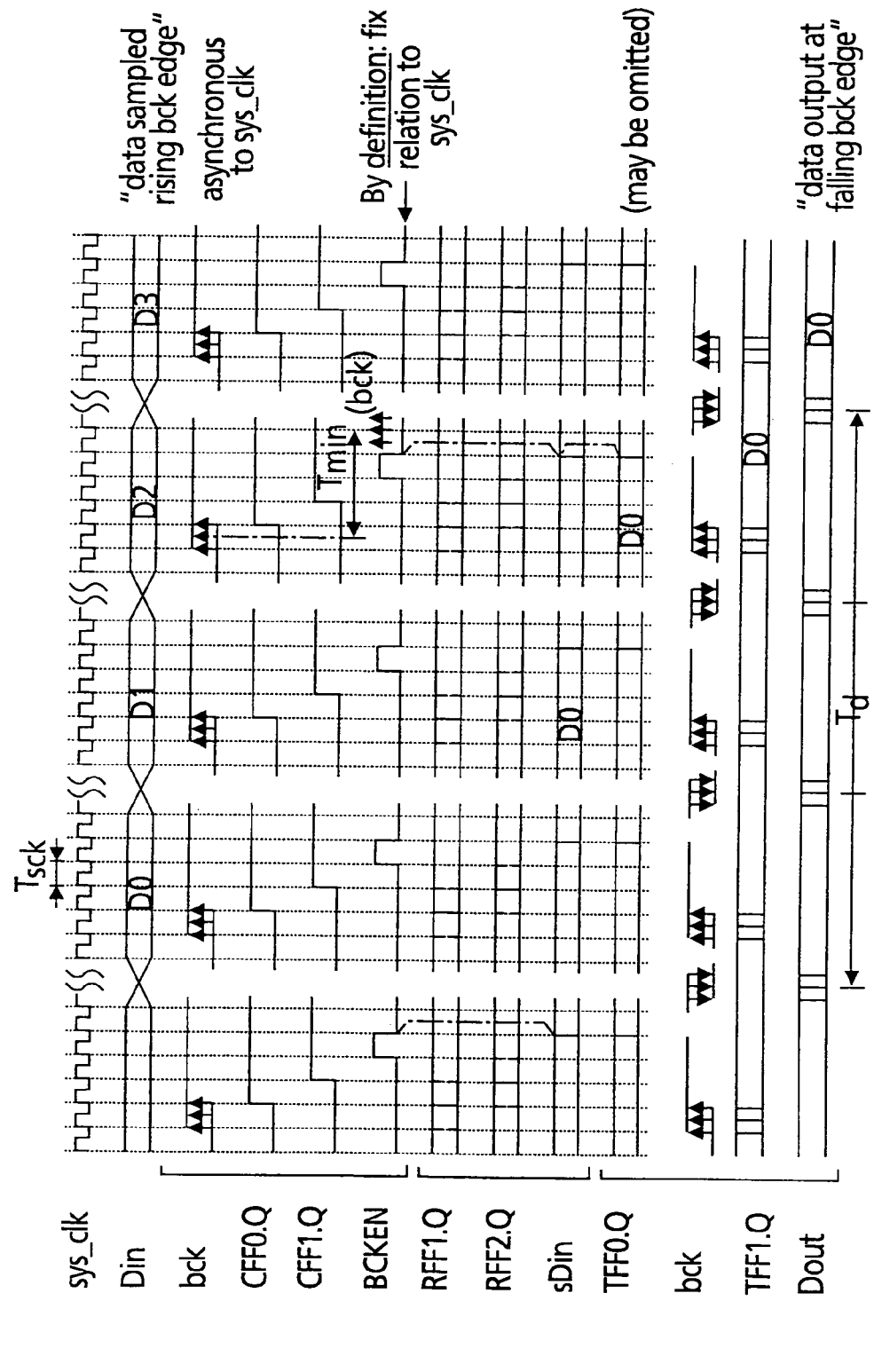
FIG. 11 sync timing.

As mentioned above, clocking the channel encoders/decoders with the system clock sys_clk avoids the clocking of main parts of the synchroniser unit partly depicted in FIG. 11 with any one of the several possible audio bit clocks selected by a multiplexer. Only the final synchronisation stages TFF1, TFF2 and RFF0 are clocked directly by a corresponding audio bit clock. Thus, synchronisation near chip input path avoids having two or more flip-flops clocked with the same gated edge. This synchroniser is contained in the clock unit block 16 of FIGS. 1 and 6, respectively.

Known implementations, even of SIO type, have some disadvantages due to the fact that they don not operate on samples but on processor machine words that are typically identical to single-sample words for current processors. Advantageously, undetected channel permutations or timely output using timestamps are easy to implement with the structure according to FIG. 1 or FIG. 6, respectively, because the stream unit does process audio samples instead of words.

Figure 1:
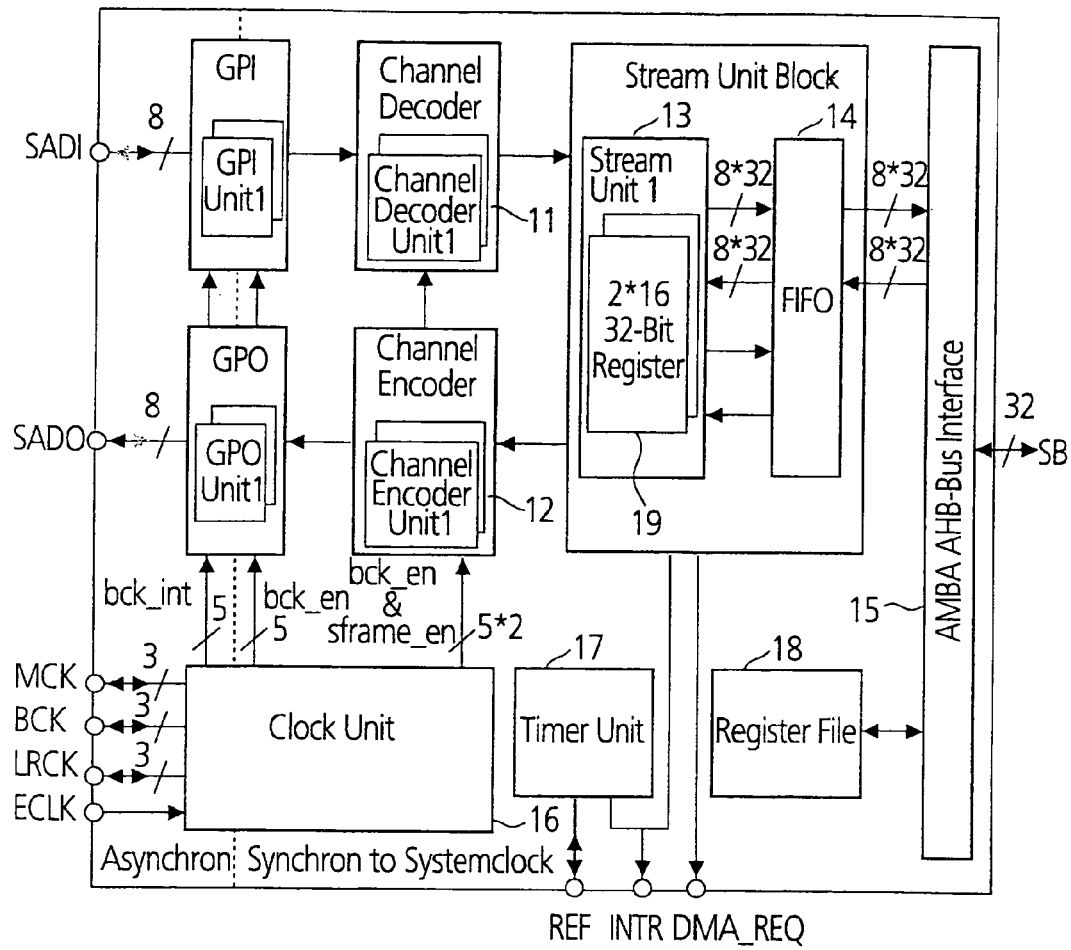
FIG. 1 simplified block diagram of the inventive digital audio interface unit.
Figure 2:
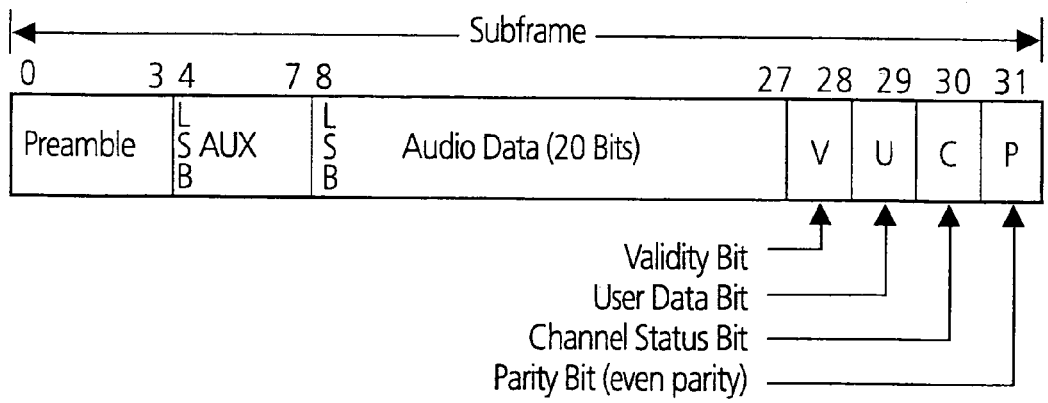
FIG. 2 IEC 958 subframe format.
Figure 6:
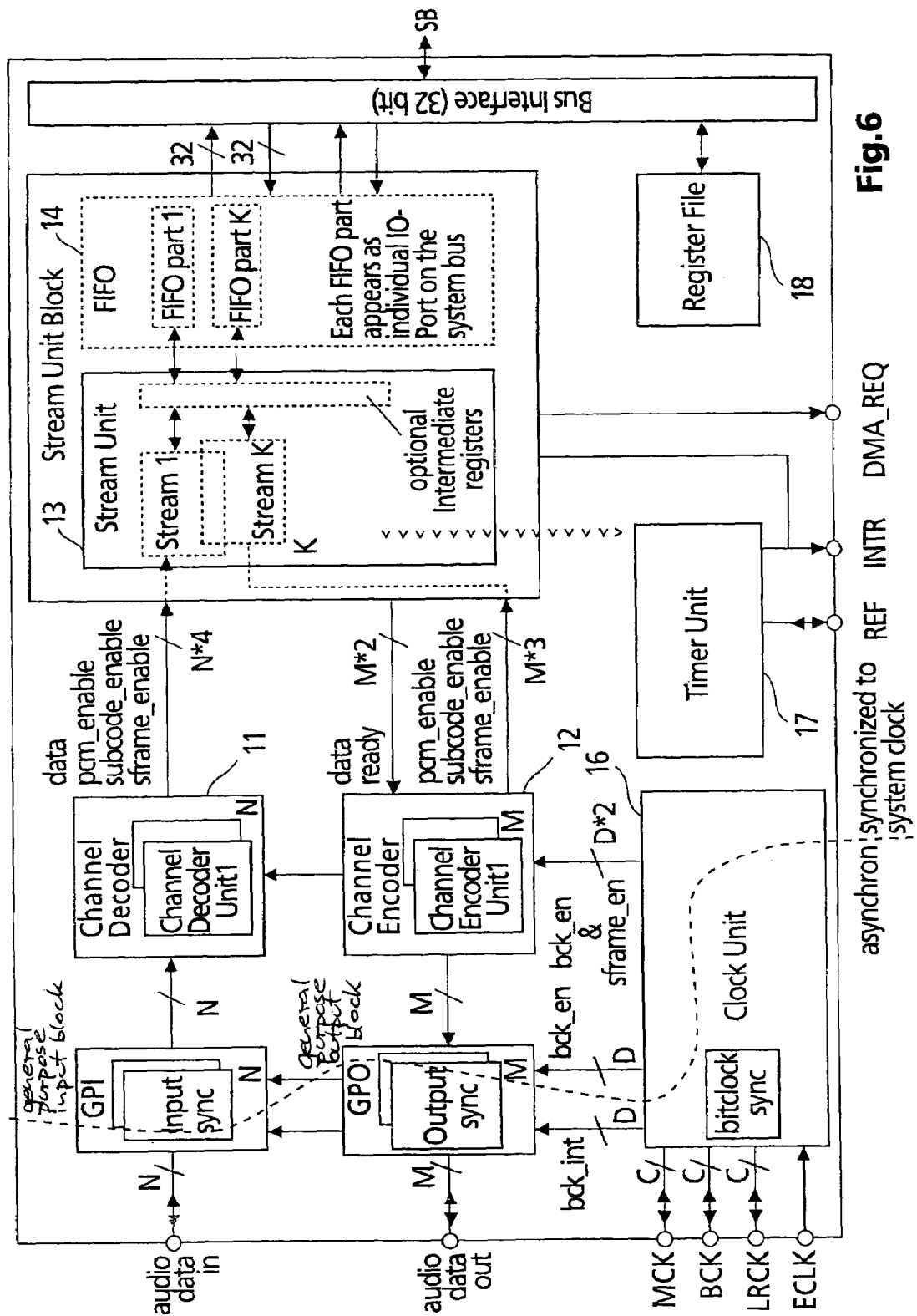
FIG. 6 more detailed version of the FIG. 1 block diagram.

Several embodiments are described in the following. In FIGS. 1 and 6 the interface signals between channel decoders/encoders 11, 12 and stream unit 13 include the corresponding information signal sframe_enable (sample frame enable), which is a one system clock (syc_clk) cycle pulse indicating the start of a new sample, generated by the channel encoder or channel decoder for stream unit 13. One-cycle pulses of signal pcm_enable and subcode_enable, respectively, indicate syc_clk cycles carrying or requesting a valid PCM-respective subcode-bit on the related data line.

Figure 8:
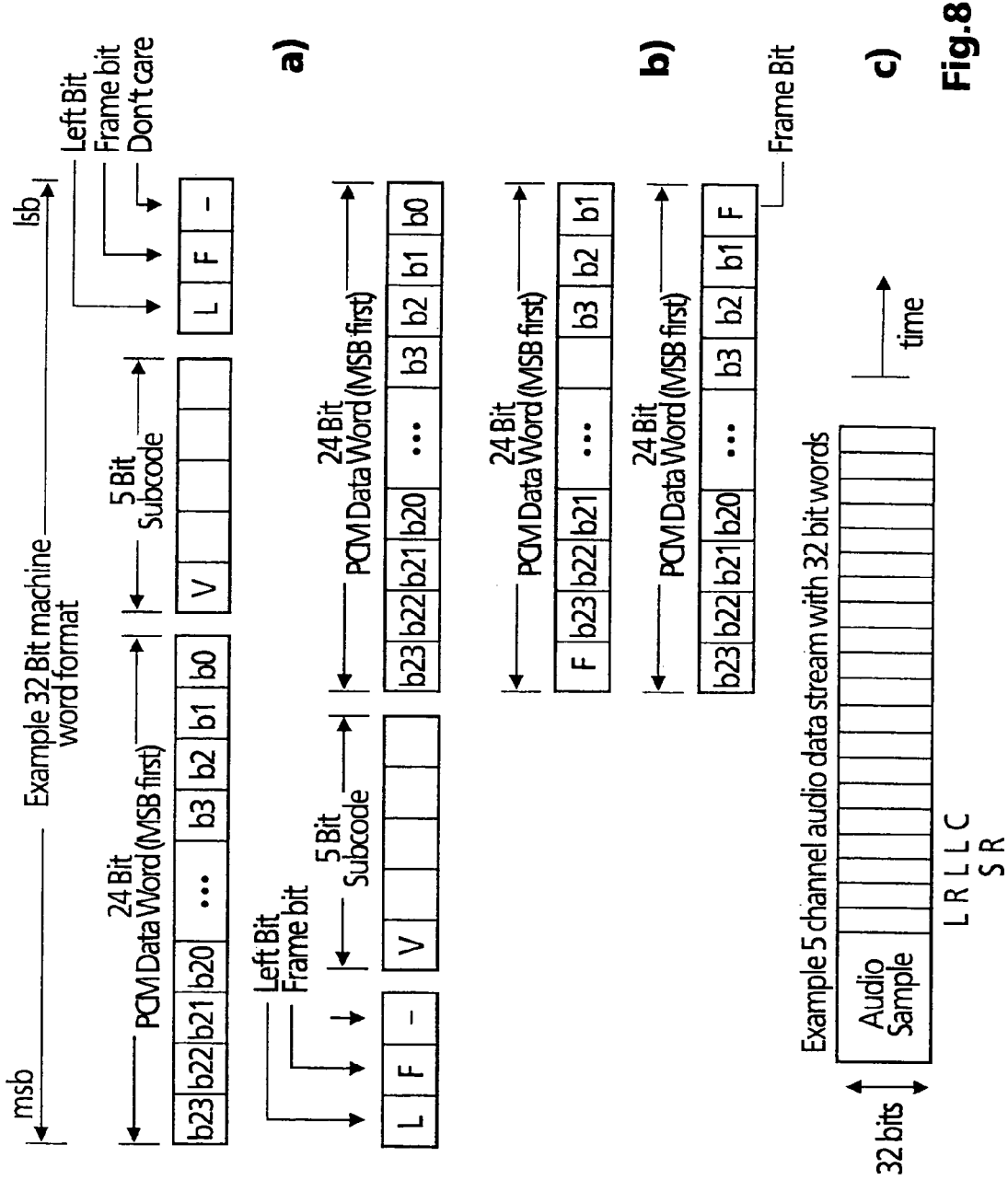
FIG. 8 example formats for storage in a FIFO or in a system memory (not depicted)

Basic Audio PCM and Stream Format:

It is assumed that an audio stream transporting a P-channel audio signal (P=1, 2, 3, . . . up to the maximum number of channels per stream supported) is transmitted in sample sequential form, with each sample (e.g. stereo or 6-channel sample) consisting of P data words (e.g. data words of 32 bit), one per channel. Then the audio content size of the input words transmitted by the considered audio interfaces does not exceed or does not need to exceed 24 bits maximum. Thus, if either more bits per word are available due to the chosen processor/memory system, e.g. 32 bits like for usual RISC processors or some DSPs, or a 16 bit DSP storing audio words as double words 2×16 bit, or in case not all ones of the 24 bits are required in case of e.g. a 24 bit DSP, the additional bits of the words can be used to transport other side information. If inputting data into the inventive processing system, it may be required to strip of such side information, but this operation can easily be carried out in conjunction with necessary other operations like moving, scaling, integer-to-floating point conversion, floating point-to-integer conversion at no additional cost. FIGS. 8a and b depict possible sample formats for e.g. 32 bit and 24 bit machine words (FIG. 8c) as processed in the FIFO 14 or system memory. In order to simplify conversion/removal or insertion of side information bits, formats which represent the PCM bits either left aligned or right aligned in the (larger) word are used. Therefore only these variants are shown. Regarding the PCM bits, F bits and L bits, all audio samples will have the same representation, independent of the channel encoder/decoder used, and only one of two alternative formats will be selected for the GPI/GPO cell or stage, thus representing a unique sample format to the hardware or software. For ease of understanding/presentation, the following description of the embodiments is restricted to the 32 bit format. All, or in some cases a subset, of the functionality can be implemented easily with larger or smaller machine words lengths.

Subcode:

One first type of such additional information inserted into the individual sample words can be subcode information—several interfaces like SPDIF (VUCP), ADAT (C1 . . . C4), AC97 (Tags) define subcode information. In the case of SPDIF, the subcode bits are already directly related and transmitted with each sample. FIG. 8a depicts an example 32 bit word format using 24 bits for the data, up to 5 bit per word for subcode, and 3 bit for further information. The amount and contents of the subcode depends on the type of interface. According to the invention, the amount of the original subcode bits is kept but the bit positions used for the subcode bits can be chosen fixed and unique. The only exception is the valid bit (V) that indicates validity of each sample. This information item can be interpreted and processed in a special way by stream unit 13 in the case of signal input:

a) The input words are forwarded as received, including the V-Bit, which allows software processing of the valid information, or
b) The P channel sample is discarded if all words of the sample are invalid (inhibit write to FIFO/Memory), or
c) Invalid words are muted, or
d) The sample words are interpolated from surrounding valid words in a form known from existing devices like CD players.

The preferred method for the subcode transmission is to transmit the four VUCP subcode bits together with the related sample word in case of IEC958 input, to transmit all ADAT subcode bits in the first word of a P channel sample (for formats with four subcode bits), to fill the subcode bits with adjacent non-PCM locations in the case of I2S allowing combined audio&subcode data exchange with devices like DSPs via the single I2S interface, and/or to fill the valid bit with AClink Tag bits (correlating to the data slots).

Avoiding Channel Permutation:

One problem with audio input and output is the possibility of a channel permutation. This is due to the fact that several typical machine words (typically one per audio channel) are required to transport a single P channel sample in most audio hardware configurations. The processor system (processor, DMA units, serial IO units, FIFOs) thus only copes with individual machine words but no larger entities. Therefore, if single data words are inserted or deleted erroneously from an audio data stream, the device or stage (subroutine, thread, processor, audio interface hardware etc.) reading the sequence of 'machine' words can loose track of the information about which word is related to which one of the audio channels. In a system like that described by FIG. 6 including system processor and DMA or interrupt-based or polling-based input/output of audio streams, sources of such channel permutation may be erroneous FIFO access, temporary processor computational overload making the in-time service of the input and output impossible, or temporarily increased interrupt latencies. Starting stream input or output with the proper channel therefore does not guarantee that input/output is correct later on. Even if all the above effects are considered as being system errors and thus should not appear under normal (debugged) conditions, there may be applications where a correct channel type output should be checked. In the example audio interface described in FIG. 6 the described problem can occur in the FIFO or the DMA controller. But stream unit 13 is aware of the sample boundaries due to the sframe_enable signal delivered by the channel encoders/decoders and can therefore perform this check.

The inventive feature allowing the detection and correction of channel permutation is to mark individual samples with their type so that they can be identified by the final consumer of the data stream. A safe and easy-to-implement measure is marking or setting one of the sample words of an audio sample by one of the (otherwise unused) bits to '1', in particular the 'L' bit, i.e. the first word of the sample, and setting this bit to '0' for all other words of the sample. Thus an left/right alignment error becomes detectable sample by sample. On one hand, because one end of the audio data transmission is the processor software here, this bit insertion or this check for each sample would be a relatively high burden for the processor. On the other hand, taking into account that a listener needs some time to detect a channel permutation, marking/checking the first word only of each Lth sample (L being small enough to result in a detection time of e.g. below 0.1 sec) is sufficient. Thus typical audio codec frames in the range 1152/1024 samples @48 kHz, or DMA block sizes can be used as distance for the 'F-bit' (frame bit) marks. Using DMA block size distance (first word of first sample of each DMA block is marked with F='1') allows the audio interface hardware to exactly determine the point in time where the sample with the F-bit set is output/input, identical to the first sample of a DMA block (in the processing system memory). This feature facilitates measuring additional side information like time stamps and block errors (see below) by the audio interface hardware and transferring/processing them along with the DMA block (completion).

In the case of an audio input process, the F-bit will be set for the first word of each sequence of FLEN audio samples by the stream unit hardware. Initial start-up or restart of the stream unit is always done in a manner with the first word of the first sample written to the FIFO 14 being marked with F='1'. The DMA (or interrupt or polling) data input is set-up so as to use the same block length FLEN*P, such that always the first word found after each single (DMA) block transfer in the related destination memory location should be that word with the F-bit set. This may be checked during the (DMA) block complete processing. If the first word of such an (DMA) block is not set, data input is misaligned, and re-starting the input process for this stream unit (and related DMA) is required. In the case of an output process, the (DMA) block size used for output is again initialised to a value of FLEN*P words, and the stream unit 13 as well. For each DMA block that is prepared by the software for output, only the first F-bit is set but all others are reset. Upon start of the stream unit 13, the related FIFO 14 (i.e. its part bound to that stream) must be made empty. Thus the first word read by stream unit 13 after start will be one with F-bit set, then FLEN*P-1 words with F-bit reset will follow. In the FLEN*(P+P)th word the F-bit will again be set, and so forth. The stream unit hardware checks the appearance of set F-bits. If one is misplaced, i.e. an F-bit is set for a word not output as the first of a P channel sample or a sample with F-bit set is not exactly FLEN samples apart from the previous one, or F-bits are zero during FLEN samples, the stream unit will be stopped and switched to an error status. This status will be detected by the software (status changed interrupt or polling) so that the output process can be restarted.

Figure 9:
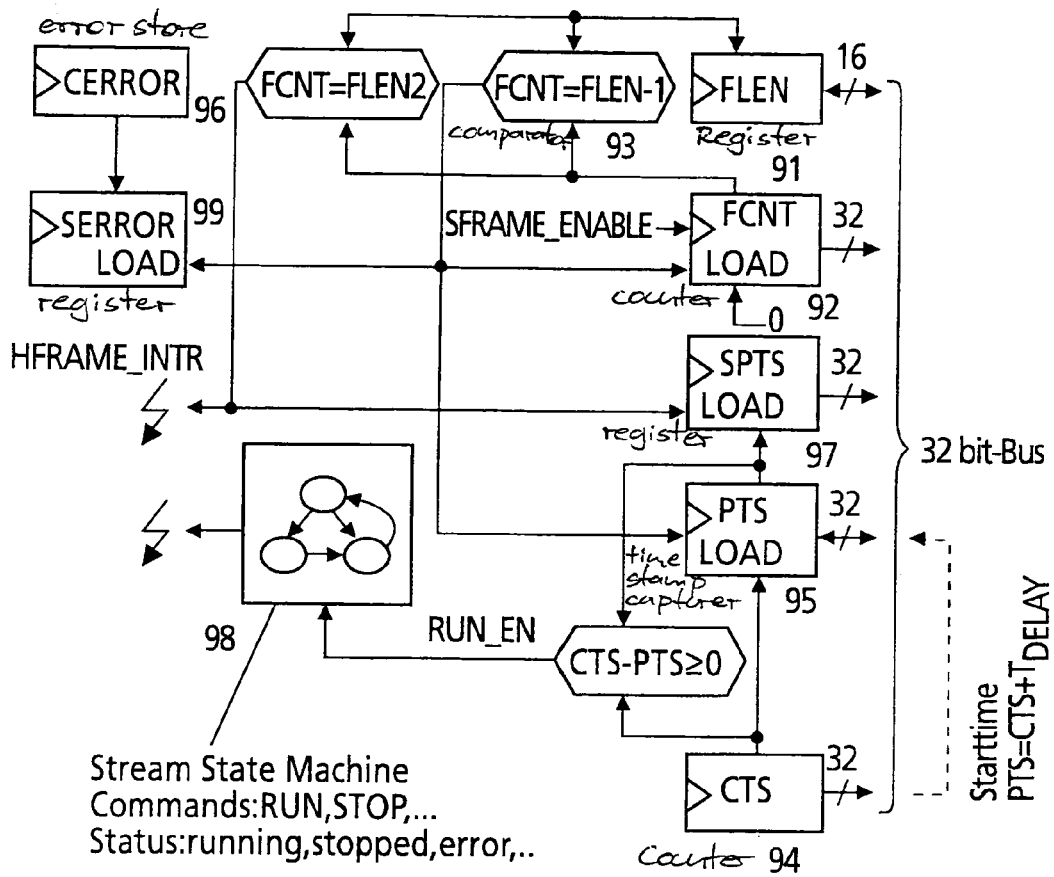
FIG. 9 counter circuitry used in a stream unit.

Hardware required in stream unit 13 is shown in FIG. 9. A frame counter 92 FCNT and a frame length (or (DMA) block sample count) register 91 FLEN are required to insert set F-bits during audio input, and to check proper appearance of F-bits during audio output. For the example implementation of FIG. 9, FCNT is incremented for each (P channel) sample (more precisely: each sframe_enable pulse from the proper channel unit), and counts from 0 to FLEN-1. Thereafter FCNT is reset to '0' again. Finally, reaching FLEN-1 indicates that the first word of the next sample should be marked with a set F-bit.

An alternative to using F-bits is the insertion/check of a SYNC word (and eventually the block length and optionally a check sum and other side information) inserted on a block basis between the samples. This has the advantage of not requiring one bit(s) per word. Instead, all bits can be used for audio data, but the mechanism cannot be completely problem-free due to the possibility of audio data words being misinterpreted as being sync words (except in case this sync code is a forbidden data word). Even if the detection is made more secure by checksums, start-up is carried out only after repeated occurrence of a SYNC word. Another alternative is marking the first word of a block in FIFO 14 (by an additional bit per word or by an additional pointer) and to check this pointer versus the actual DMA (or interrupt) pointer after each block transfer. This embodiment excludes DMA chaining. A further alternative is using a specialised DMA unit (not depicted), possibly build into the audio cell/interface—in conjunction with FIFO word marking if a FIFO is used—where the stream hardware and the DMA hardware operate such that DMA block transfer and stream unit FCNT/FLEN blocks are in phase or that the DMA unit applies the concept of words. Nevertheless this would have the disadvantage of requiring a specialised DMA unit instead of a general-purpose one.

FL-Bitfield, Don't Care Definitions:

TABLE 1

| L | F | Description |
|---|---|---|
| 0 | 0 | Sign Extension |
| 0 | 1 | New Software Frame |
| 1 | 0 | Left Channel |
| 1 | 1 | Sign Extension |

In order to reduce the number of processor operations when preparing a DMA buffer for output by the audio interface cell, the F-bit is extended to an FL 2-bit field, see table 1 and FIG. 8a. According to the table, $LF=01_b$ indicates the first word (L=0) of the first sample (F=1) of a DMA block, $LF=10_b$ indicates not-first-word of a sample. The other two codes $LF=00_b$ and $LF=11_b$ define "no specific sample". Upon audio data input, stream unit 13 inserts the codes $LF=01_b$ and $LF=10_b$ only, thus every sample is marked correctly with either L or F, allowing to check DMA block as well as individual sample alignment. During audio data output, the software will initially prepare the DMA output buffer either with a sign-extended right aligned 24 bit PCM number (within 32 bit) having the $LF=00_b$ or $LF=11_b$ codes, or with a left aligned 24 bit PCM number of which the lower eight bits are initially zero (LF=00), see FIG. 8a. The stream unit 13 interprets the codes $LF=00_b$ and $LF=11_b$ as "no specific sample information" and outputs the sample as the next word. The very first word of each DMA buffer is marked by the software with an $LF=10_b$ code before starting the DMA block output, i.e. the code leading to a stream unit F-bit check. If the check result is 'not true', the stream unit stops and the output process can be restarted by software, see above. The LF bit field obtained by an audio input process can be re-used as is true for an audio output process if the DMA block length and the number of channels is identical.

Time Stamping, Block Errors, SPTS:

The above-mentioned extensions of stream unit 13, one extension per each independent input or output stream, namely the counter 92 FCNT, the register 91 FLEN, and the F-bit mechanism, facilitate capturing a rather exact PTS time stamp in register 95 related to the very first word of a DMA buffer (not depicted), and for capturing a cumulative error register SERROR 99 collecting the error information for exactly the samples in the DMA block. This is done using the comparison result 93 FCNT=FLEN-1 and sframe_enable for enabling that capturing.

Counter 94 CTS (current time) in FIG. 9 represents a machine word width (32 bit) up counter counting every system clock and wrapping around to '0' when the maximum 0xFFFF FFFF is reached. The output of counter CTS can be used as time base for the audio interface cell. Stage 95 PTS (presentation time stamp) is capturing the CTS value upon (FCNT=FLEN-1) AND sframe_enable.

Channel error store 96 CERROR is cleared when sampled by SERROR register 99, and collects thereafter all error information related to the input or output signal until it is sampled again (e.g. at (FCNT=FLEN-1) AND sframe_enable). Thus SERROR contains exactly the channel error information related to all the samples of the just finished/finishing DMA block. During audio input, an active SERROR indicates that the complete input block should either be further examined for errors or be muted or ignored, the latter two features allowing to handle errors conveniently on a block basis.

During audio input, at first the stream unit 13 will find (FCNT=FLEN-1) a block end, sample PTS and an information item SERROR, and can mark the next sample with F=1. Then, after reading the last block sample from FIFO 14, the DMA unit issues its block complete signal (interrupt). Thus the PTS and SERROR register values can conveniently be read by software during the DMA complete interrupt and can be conveniently attached to the just finished DMA block or the next DMA block (the latter is advantageous for PTS because both values are sampled at block end). Obviously this requires that 'FIFO size used<FLEN*P' and 'interrupt latency<DMA frame period', otherwise the relation between sampled PTS/SERROR values and DMA block could be lost. "FIFO size used" denotes the number of sample words stored actually. "DMA frame period" denotes the time intervall $FLEN/F_s$, $F_s$=sample frequency. As a shorter alternative, 'interrupt latency<$FLEN/F_s$' could be used. For audio output, the DMA complete status may happen before the sampling has taken place because of the FIFO delay. Thus reading PTS and SERROR during DMA complete status is not appropriate. Instead, reading both values for example in the middle of a DMA block (i.e. FCNT=FLEN/2) by interrupt or, instead of reading PTS, reading the SPTS register 97 (samples PTS at about that time), can be used as long as 'FIFO size used<0.5*FLEN*P' and 'interrupt latency<$0.5*FLEN*1/F_s$', $F_s$=sample frequency. For example, a worst case accuracy of 100 ppm for the sys_clk oscillator and a 1152-sample DMA frame size at a sampling rate of 44100 Hz leads to a DMA frame period of 26.1 ms, resulting in a worst-case timestamp accuracy of about 5.2 µs being achievable if the reference clock oscillator has a 100 ppm accuracy, too.

Timed Start-up:

A further function explained in connection with FIG. 9 facilitates a precisely timed start-up of stream unit 13. The stream unit is started with an empty FIFO 14 and with a stopped stream unit status sequencer (not depicted). The PTS register 95 is loaded with the proper start time (which relates to CTS), and the RUN command issued to the stream status machine 98. After CTS is advanced to the start time, i.e. the condition mod(CTS-PTS)≧0 is true, the run enable signal RUN_EN is issued to stream status machine 98.

Common I/O Timing

Figure 10:
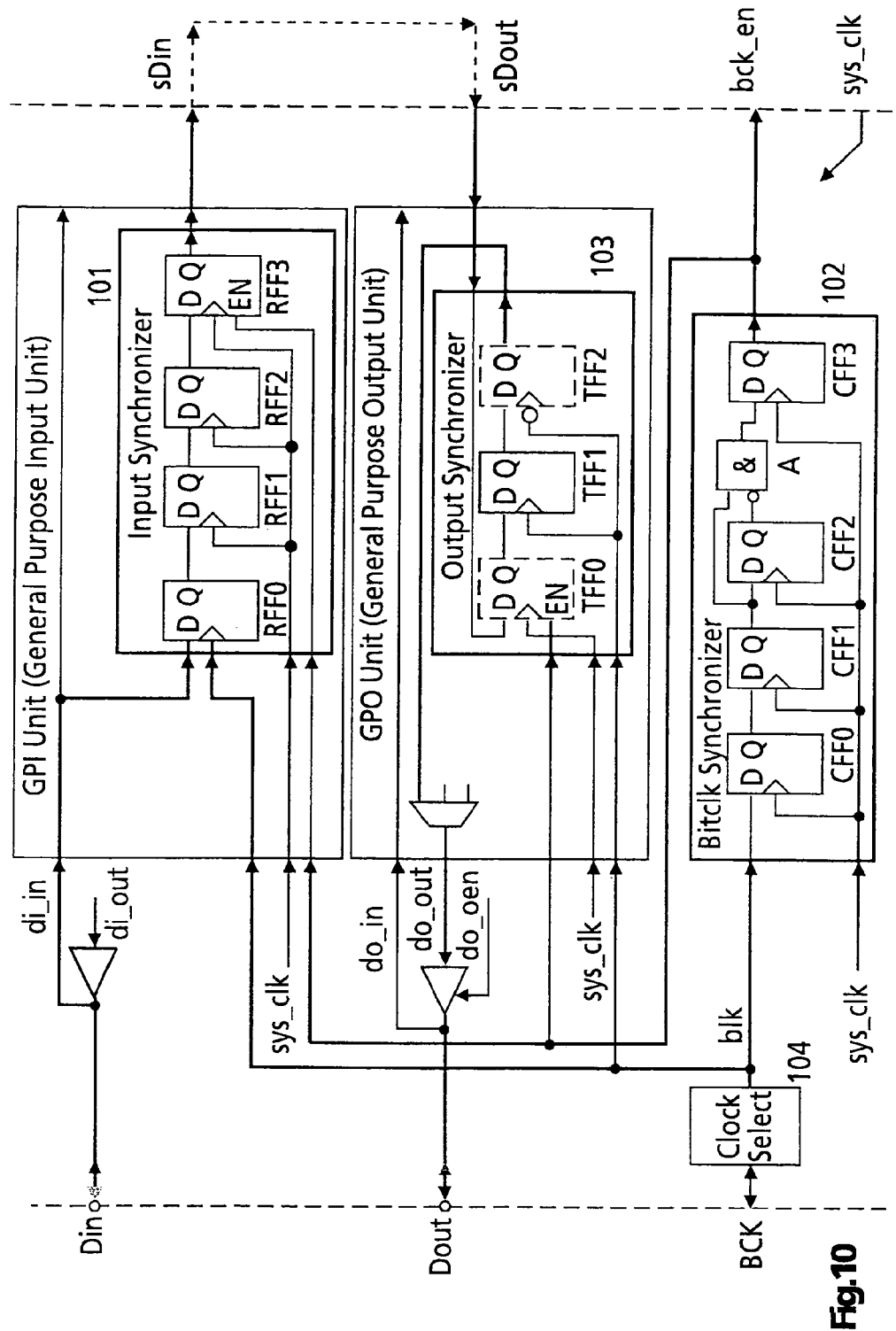
FIG. 10 GPI/synchroniser unit block diagram.

The input and output signals can be synchronised from a "bit clock (bck) domain" to a higher system clock (sys_clk) domain, whereby the bit clock domain input-to-output delay, which can be expressed by a simple multiple of "bit clock" periods, is completely independent from the "system clock" frequency. If the signals related to a serial audio data interface having separate clock and data and/or sync signals—like the above-mentioned I2S (see FIG. 5, DATA/LRCK synchronous to BIT_CLK) or AClink (AC97) interfaces—are processed by a logic using only a common (higher) system clock (FIG. 10, sys_clk) instead of the bit or channel clock of the interface (BCK=bck in FIG. 10, BIT_CLK in FIG. 5), additional clock synchronisation stages are required as long as the audio interface clock or clocks do not have a fixed phase and exact frequency integer multiplicity to the system clock. This clock synchronisation can be fulfilled by using an arrangement of two D flip-flops like RFF1/RFF2 and/or CFF0/CFF1, respectively, as depicted in FIG. 10. These D flip-flops are clocked with the system clock sys_clk. The input signal or signals (signal at RFF0 output Q and/or the clock bck) to be synchronised are fed to the D input of the first flip-flop CFF0 and RFF1, respectively. The thus 'synchronised' input signal is available at the Q output of the second flip-flop CFF1 and RFF2, respectively. Such double flip-flop circuitry reduces the probability of errors of the first flip-flop to a sufficiently low amount, due to the well-known effect of 'metastability': violation of the first flip-flop's inputs set-up of a hold window leads to an undefined output status of the flip-flop for any given period of time with a technology-dependent probability. Such metastable status of the flip-flop is instable. However, the double flip-flop circuitry advantageously forces the respective flip-flop to settle again in any one of its two stable statuses within about one clock period. In more detail, the commonly used form of synchronisers for the reference clock bck in FIG. 10 uses some form of such metastability suppression circuitry (like CFF0 and CFF1) and a subsequent edge detector (embodied for example for the rising edge by a flip-flop CFF2, an AND gate A and a flip-flop CFF3) to obtain an enable signal bck_en indicating a is single system clock cycle (one enable cycle per e.g. each rising edge of the original clock bck) in which the output of a similar input circuitry ('input synchroniser' 101) can be read by subsequent synchronous logic (RFF3 in synchroniser 101). Keeping the delay (measured in number of system clocks) of the input synchroniser 101 and the bit clock synchroniser 102 almost identical, results in a system behaviour for the input side (bck, RFF0.Q) that can be described as sampling the input signal (RFF0.Q) around the e.g. rising edge of signal bck within a window of about one sys_clk period. Thus an input signal (RFF0.Q) that is synchronous to the bck clock but asynchronous to the sys_clk can be read correctly at about the e.g. rising edge of clock bck as long as the system clock sys_clk is somewhat higher than the clock bck to be synchronised. Flip-flop RFF0 samples the input signal Din with the bit clock bck in order to achieve a well-defined (small) set-up and hold range (around e.g. the rising bck slope) for the input data Din instead of achieving only a (larger) window determined by the cycle time of the system clock sys_clk.

The time diagram of FIG. 11 shows the various signals occurring within the input synchronisation circuitry of FIG. 10 in their temporal relations. The sample windows, i.e. the time periods where sampling of the input signals can take place are indicated in connection with input signal Din.

Related to FIG. 10, equivalent circuitry sampling on falling edges or both edges of clock bck can be used instead.

In the circuitry of FIG. 10, outputting data from the synchronous (sys_clk) domain to the interface type-specific domain can be accomplished in an output synchroniser 103 by using the output signal of a flip-flop like TFF0 that is clocked with the system clock sys_clk and enabled with signal bck_en. Output data will appear about at the end of the bck_en cycle (plus flip-flop clock-to-output delay), thus after the e.g. rising edge of clock bck from which the bck_en pulse was derived, as long as the (sys_clk frequency)/(bck frequency) integer ratio is high enough before the next e.g. rising bck edge. In order to obtain an output point in time that is well-defined in relation to the bck edges, the output of TFF0 is re-sampled by flip-flop TFF1 with the e.g. rising edge of bck, whereby its output Q is re-sampled by flip-flop TFF2 with the falling edge of bck_en, in order to be conform to the standard I/O features used for audio interfaces: the inputs are sampled with the rising edge of the bit clock, the outputs change with falling edges of the bit clock. The time diagram of FIG. 11 also shows the corresponding signals occurring within the output synchronisation circuitry of FIG. 10 in their temporal relations. Equivalent output synchronisation circuitry sampling on falling edges or both edges of clock bck can be used instead.

Flip-flops TFF0 and TFF2 are optional to some extent. TFF0 can also be arranged outside the synchroniser, whereby each output signal of the sys_clk synchronous logic domain (as is true for signal sDout in FIG. 10) must have the same characteristics, i.e. stems from a flip-flop that is clocked with sys_clk and enabled with bck_en. TFF2 is required only if the above standard I/O features used for audio interfaces are required. If that is not necessary the input sampling and output change is affected by the same type of edge of clock bck, e.g. the rising edge.

The clock select unit 104 selects either an external bit clock BCK, or an internal bit clock bck, that is used for the synchronisation process. If the internal clock source is used, this same clock can be output to BCK or not. The clock select unit may also invert signals passing through.

A set of input/output/clock synchronisers consisting of:
an input stage RFF0 and the output stage TFF1 that is clocked with the same type of 'sample' edge (e.g. rising) of bit clock bck,
the second optional output stage TFF2 that is clocked with the opposite type of 'output' edge,
Metastability 'suppression' circuitry for bit clock bck (CFF0, CFF1) and for the data input Din (RFF1, RFF2), i.e. at least one flip-flop working in the sys_clk domain that is clocked with sys_clk and enabled with bck_en (RFF3 and TFF0), has the following characteristics (wherein the exact values apply to the preferred embodiment in FIG. 10 without flip-flop TFF0):
a) The set-up and hold interval of Din versus bck is determined by RFF0, independent of the sys_clk characteristics;
b) the bck 'output edge' (e.g. falling)-to-Dout propagation delay is characterised by the TFF2 (if used) or TFF1 (otherwise) clock-to-output delay, not by sys_clk parameters;

c) As long as the ratio (sys_clk frequency)/(bck frequency) is greater than 3 ... 4, an effective 'constant synchroniser delay' of two bck cycles (see FIG. 11, $T_d$) between Din and Dout applies. This delay applies if sDout and sDin are directly connected (dash dotted line) and the TFF0 flip-flop is omitted. Each additional flip-flop inserted into the loop (like TFF0) adds another bck cycle to this delay, i.e. the system clock must be significantly higher than the bit clock but the logic for the synchronous domain can be designed independently from the frequency ratio.

Variations of the metastability suppression circuitry and the edge detector are possible: by clocking on different clock edges of the same signal and/or by combining the CFF1 and CFF2 flip-flops into a single one the required (sys_clk frequency)/(bck frequency) ratio can be reduced, for the price of reducing the maximum possible sys_clk frequency, in order to achieving the same metastability error probability. The example implementation in FIG. 10 reduces that frequency ratio to about '2', but shortens the time available for metastability settling by more than factor '2' if the same system clock is used.

It should be noted that synchronisation signals required and existing only in of some of the audio interfaces (in I2S interface: LRCK=left right indication; in AC97 interface: SYNC; or word strobes for usual serial DSP interfaces), which in principle indicate the first (or some other bit n) of each serially transmitted audio (m-channel) sample with a synchronisation signal edge, can be handled like the Din and Dout signal: to input a synchronisation signal an input synchroniser (FIG. 10, 101), to output such a synchronisation signal an output synchroniser (FIG. 10, 103) could be used because these synchronisation signals typically have the same or similar timing like the data signals (inputs should sample with one edge of BCK, output with the opposite). A clock synchroniser is required only for the bit clock, all other signals transmitted that are synchronised to this bit clock are to be processed by the input and output synchroniser cells. Consequently, sync versus data input signals, as well as sync versus data output signals, do not incur different delays due to synchronistion logic, but input versus output side (like sync input versus data output) does incur a delay $T_d$ as shown for the Din versus Dout case in FIG. 11.

Advantages of the Inventive Stream Unit and Synchroniser

Channel (F Bit) permutation can be avoided; FL Bits related: don't care output sync; (PTS) block time stamping is used; timed start-up is feasible; the block error processing can be built into the stream units.

Lower complexity because typically the number of stream units required is significantly lower than the number of protocol units/shifter units.

Single-software implementation is possible due to the implementation in a single stream unit and processing of the side info together with the audio data.

Concerning the synchroniser with constant bit clock delay, on one hand a system clock significantly higher than the bit clock to be synchronised is required, thus it is not applicable for every synchronisation case. But it is applicable for audio applications because typical audio bit clock frequencies are significantly lower than system clocks applicable for actual IC technology, and to some extent also for current FPGA technology. This constant bit clock delay can be achieved for all ratios sysclk/bitclk>N, wherein N depends on the chosen synchronisation logic.

What is claimed, is:

1. Method for pre-processing input signals of interfaces of different type for common-format central processing, using a common system clock, said different interface types being associated with differing sample clock frequencies and/or differing data frame or data word formats, said method including the steps:

generating from the input signals of interfaces of different type system clock synchronised input signals;

channel decoding said system clock synchronised input signals according to differing channel protocols related to said different-type interfaces, thereby providing corresponding PCM bitstream format signals having a uniform word format;

further processing said PCM bitstream format signals so as to form therefrom sample words that are stored in an intermediate store from which the sample words are fed to said central processing.

2. Method for pre-processing output signals for interfaces of different type in a common-format central processing using a common system clock, said different interface types being associated with differing sample clock frequencies and/or differing data frame or data word formats, said method including the steps:

further processing sample words that were output from said central processing and stored in an intermediate store by forming system clock synchronised PCM bitstream format signals therefrom, which PCM bitstream format signals have a uniform word format and are related to said interfaces of different type;

channel encoding said system clock synchronised PCM bitstream format signals having a uniform word format according to differing channel protocols related to said different-type interfaces, thereby providing corresponding system clock synchronised output signals;

generating from said system clock synchronised output signals interface-type related output signals that are no more system clock synchronised but conform to said type of interface.

3. Apparatus for pre-processing input signals of interfaces of different type for common-format central processing, using a common system clock, said different interface types being associated with differing sample clock frequencies and/or differing data frame or data word formats, said apparatus including:

means for generating from the input signals of interfaces of different type system clock synchronised input signals;

means for channel decoding said system clock synchronised input signals according to differing channel protocols related to said different-type interfaces, thereby providing corresponding PCM bitstream format signals having a uniform word format;

means for further processing said PCM bitstream format signals so as to form therefrom sample words that are stored in an intermediate store from which the sample words are fed to a central processing.

4. Apparatus for pre-processing output signals for interfaces of different type in a common-format central processing using a common system clock, said different interface types being associated with differing sample clock frequencies and/or differing data frame or data word formats, said apparatus including:

means for further processing sample words that were output from said central processing and stored in an intermediate store by forming system clock synchronised PCM bitstream format signals therefrom, which PCM bitstream format signals have a uniform word format and are related to said interfaces of different type;

means for channel encoding said system clock synchronised PCM bitstream format signals having a uniform word format according to differing channel protocols related to said different-type interfaces, thereby providing corresponding system clock synchronised output signals;

means for generating from said system clock synchronised output signals interface-type related output signals that are no more system clock synchronised but conform to said type of interface.

5. Method according to claim 1, wherein said interface types include at least two of IEC958, I2S, AC-Link and ADAT.

6. Method according to claim 1, wherein some individual samples are marked or checked with their channel type in the system clock synchronised processing in order to detect and avoid channel permutation, said channel permutation occurring in case of insertion or deletion of samples, said marking being carried out by using subcode bits that are otherwise not used in said system clock synchronised processing.

7. Method according to claim 1, wherein for DMA data block transfer in connection with said intermediate storage an LF marking is carried out for the first word of each DMA data block and is evaluated in order to reduce the number of processor operations when preparing a DMA buffer output.

8. Method according to claim 1, wherein for facilitating a precisely timed start-up of a stream unit that performs said further processing of the sample words, an internally generated time stamp is supplied to the stream unit by the central processing.

9. Method according to one of claim 1, wherein for synchronisation of interface signals that have separate clock and data or sync signals to said system clock, two succeeding D flip-flops are used that are clocked by the same edge of the clock to be synchronised.

10. Apparatus according to claim 3, wherein said interface types include at least two of IEC958, I2S, AC-Link and ADAT.

11. Apparatus according to claim 3, wherein some individual samples are marked or checked with their channel type in the system clock synchronised processing in order to detect and avoid channel permutation, said channel permutation occurring in case of insertion or deletion of samples, said marking being carried out by using subcode bits that are otherwise not used in said system clock synchronised processing.

12. Apparatus according to claim 3, wherein for DMA data block transfer in connection with said intermediate storage an LF marking is carried out for the first word of each DMA data block and is evaluated in order to reduce the number of processor operations when preparing a DMA buffer output.

13. Apparatus according to claim 3, wherein for facilitating a precisely timed start-up of a stream unit that performs said further processing of the sample words, an internally generated time stamp is supplied to the stream unit by the central processing.

14. Apparatus according to claim 3, wherein for synchronisation of interface signals that have separate clock and data or sync signals to said system clock, two succeeding D flip-flops are used that are clocked by the same edge of the clock to be synchronised.

15. The method according to claim 1, wherein the intermediate store comprises a FIFO.

16. The method according to claim 2, wherein the intermediate store comprises a FIFO.

17. The apparatus according to claim 3, wherein the intermediate store comprises a FIFO.

18. The apparatus according to claim 4, wherein the intermediate store comprises a FIFO.

* * * * *